United States Patent
Gao et al.

(10) Patent No.: US 10,026,193 B2
(45) Date of Patent: Jul. 17, 2018

(54) METHODS AND SYSTEMS OF DETERMINING COSTS FOR OBJECT TRACKING IN VIDEO ANALYTICS

(71) Applicant: QUALCOMM Incorporated, San Diego, CA (US)

(72) Inventors: Jinglun Gao, Milpitas, CA (US); Ning Bi, San Diego, CA (US); Ying Chen, San Diego, CA (US); Lei Wang, Clovis, CA (US)

(73) Assignee: QUALCOMM Incorporated, San Diego, CA (US)

(*) Notice: Subject to any disclaimer, the term of this patent is extended or adjusted under 35 U.S.C. 154(b) by 41 days.

(21) Appl. No.: 15/229,456

(22) Filed: Aug. 5, 2016

(65) Prior Publication Data
US 2017/0345179 A1 Nov. 30, 2017

Related U.S. Application Data

(60) Provisional application No. 62/340,724, filed on May 24, 2016.

(51) Int. Cl.
*G06K 9/00* (2006.01)
*G06T 7/60* (2017.01)
*G06K 9/46* (2006.01)

(52) U.S. Cl.
CPC ............ *G06T 7/60* (2013.01); *G06K 9/4671* (2013.01); *G06K 9/00* (2013.01); *G06T 2207/10004* (2013.01)

(58) Field of Classification Search
CPC .............. G06T 7/246; G06T 7/277; G06T 2207/20016; G06T 2207/20021;
(Continued)

(56) References Cited

U.S. PATENT DOCUMENTS 6,570,608 B1 * 5/2003 Tserng ............... G06K 9/00335
348/143
7,418,113 B2 * 8/2008 Porikli ..................... G06K 9/32
348/143
(Continued)

OTHER PUBLICATIONS

Khalaf R.Y., et al., "Improving Multiple People Tracking Using Temporal Consistency," Massachusetts Institute of Technology, Cambridge, MA, MIT Dept. of Architecture House_n Project Technical Report, 2001, pp. 1-8.
(Continued)

*Primary Examiner* — Aklilu Woldemariam
(74) *Attorney, Agent, or Firm* — Kilpatrick Townsend & Stockton

(57) ABSTRACT

Techniques and systems are provided for processing video data. For example, techniques and systems are provided for determining costs for blob trackers and blobs. A blob can be detected in a video frame. The blob includes pixels of at least a portion of a foreground object. A physical distance between a blob tracker and the blob can be determined. A size ratio between the blob tracker and the blob can also be determined. A cost between the blob tracker and the blob can then be determined using the physical distance and the size ratio. In some cases, a spatial relationship between the blob tracker and the blob is determined, in which case the physical distance can be determined based on the spatial relationship. Blob trackers can be associated with blobs based on the determined costs between the blob trackers and the blobs.

27 Claims, 9 Drawing Sheets

(58) Field of Classification Search
CPC .. G06T 7/19; G06T 7/20; G06T 7/254; G06T 2207/30108; G06T 7/0004; G06T 7/10; G06T 7/136; G06T 7/194; G06T 2207/10; G06T 2207/20076; G06T 2207/30196; G06T 2207/30241; G06T 7/207; G06T 7/215; G06T 7/223; G06T 7/75; G06T 2207/10016; G06T 2207/30236; G06T 7/248; G06T 7/60; G06T 2207/10004; G06T 2207/20036; G06T 2207/20224; G06T 2207/30232; G06T 2210/12; G06T 7/11; G06T 7/13; G06T 15/20; G06T 2200/21; G06T 2207/10012; G06T 2207/10024; G06T 2207/10052; G06T 7/0075; G06T 7/557; G06T 7/593; G06T 7/85; G06T 7/70; G06T 7/73; G06T 7/97; A01K 1/031; A01K 29/005; G06K 9/00369; G06K 9/00771; G06K 9/32; G06K 2009/3291; G06K 9/00785; G06K 9/00885; G06K 9/209; G06K 9/38; G06K 9/6221; G06K 9/66; G06K 9/00389; G06K 9/4652; G06K 9/52; G06K 9/6212; G06K 9/00335; G06K 9/00664; G06K 9/00718; G06K 2009/23; G06K 9/3241; G06K 9/00751; G06K 9/00228; G06K 9/00281; G06K 9/00355; G06K 9/00362; G06K 9/6277; G06K 9/6293; G06K 9/6297; G06K 9/00523; A61B 5/097; A61B 5/1176; A61B 5/18; B60K 28/063; B60W 2540/24; G01B 11/14; C01S 3/7864; C01S 5/16; G06F 3/011; G06F 3/016; H04N 13/0022
USPC ........ 382/103, 106, 201, 209, 173; 348/143
See application file for complete search history.

(56) References Cited

U.S. PATENT DOCUMENTS

| | | | |
|---|---|---|---|
| 2003/0040815 A1* | 2/2003 | Pavlidis | G06F 3/005 700/48 |
| 2006/0170769 A1* | 8/2006 | Zhou | G06K 9/00362 348/143 |
| 2008/0118106 A1* | 5/2008 | Kilambi | G06K 9/00362 382/103 |
| 2008/0170751 A1* | 7/2008 | Lei | G06T 7/215 382/103 |
| 2008/0181453 A1* | 7/2008 | Xu | G06T 7/215 382/103 |
| 2009/0041297 A1* | 2/2009 | Zhang | G06K 9/00362 382/103 |
| 2009/0087024 A1* | 4/2009 | Eaton | G06K 9/00335 382/103 |
| 2009/0226037 A1 | 9/2009 | Yang et al. | |
| 2010/0045799 A1* | 2/2010 | Lei | G06K 9/00369 348/169 |
| 2012/0148093 A1 | 6/2012 | Sharma | |
| 2012/0154579 A1 | 6/2012 | Hampapur et al. | |
| 2012/0163657 A1* | 6/2012 | Shellshear | G06K 9/00751 382/103 |
| 2013/0148852 A1 | 6/2013 | Partis et al. | |
| 2013/0336524 A1* | 12/2013 | Zhang | G06K 9/00355 382/103 |
| 2014/0050355 A1* | 2/2014 | Cobb | G06K 9/00771 382/103 |
| 2014/0098989 A1* | 4/2014 | Datta | G06K 9/00778 382/103 |
| 2014/0254933 A1 | 9/2014 | Jin et al. | |
| 2014/0339374 A1* | 11/2014 | Mian | G08G 1/0175 246/473.1 |
| 2015/0178571 A1 | 6/2015 | Zhang et al. | |

OTHER PUBLICATIONS

Chen Z., et al., "Lane Detection by Trajectory Clustering in Urban Environments", 17th International IEEE Conference on Intelligent Transportation Systems (ITSC), Oct. 8, 2014, XP032686007, pp. 3076-3081, DOI: 10.1109/ITSC.2014.6958184 [retrieved on Nov. 14, 2014].

International Search Report and Written Opinion—PCT/US2017/024720—ISA/EPO—dated May 29, 2017.

* cited by examiner

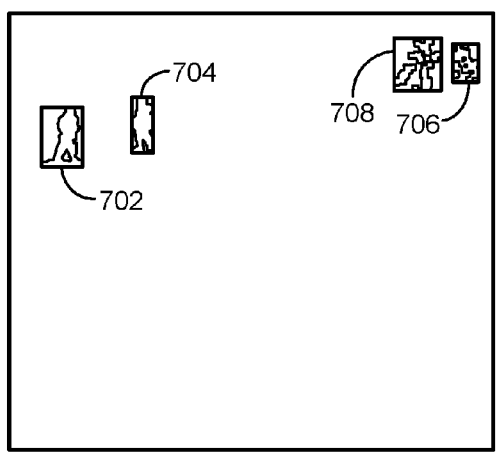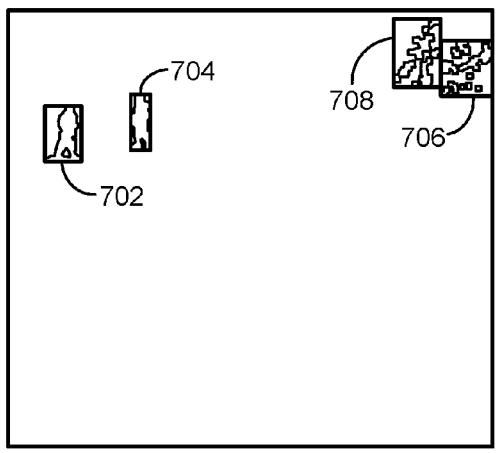
FIG. 7A  FIG. 7B
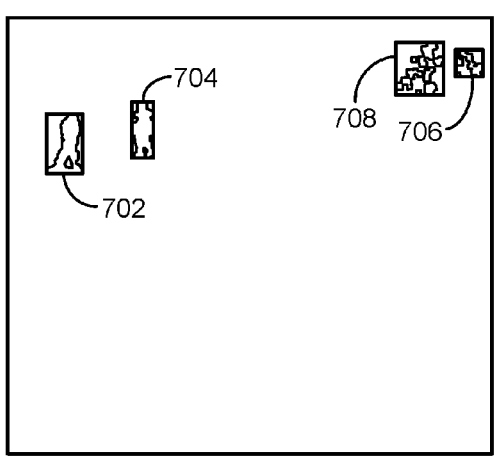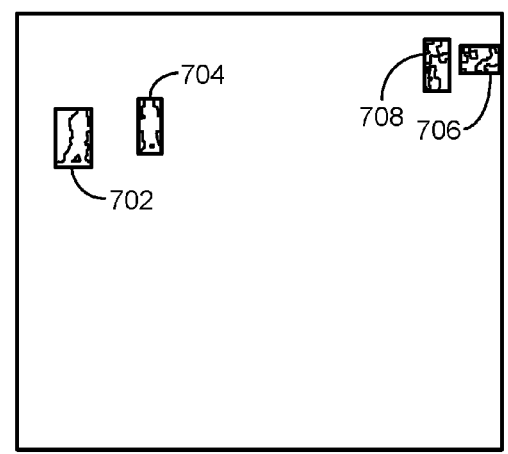
FIG. 7C  FIG. 7D

900

```
┌─────────────────────────────────────┐
│ DETECT A BLOB IN A VIDEO FRAME, WHEREIN │
│ THE BLOB INCLUDES PIXELS OF AT LEAST A  │
│ PORTION OF A FOREGROUND OBJECT          │
│                 902                     │
└─────────────────────────────────────┘
                  │
                  ▼
┌─────────────────────────────────────┐
│ DETERMINE A PHYSICAL DISTANCE BETWEEN │
│ A BLOB TRACKER AND THE BLOB            │
│                 904                    │
└─────────────────────────────────────┘
                  │
                  ▼
┌─────────────────────────────────────┐
│ DETERMINE A SIZE RATIO BETWEEN THE    │
│ BLOB TRACKER AND THE BLOB              │
│                 906                    │
└─────────────────────────────────────┘
                  │
                  ▼
┌─────────────────────────────────────┐
│ DETERMINE A COST BETWEEN THE BLOB     │
│ TRACKER AND THE BLOB USING THE         │
│ PHYSICAL DISTANCE AND THE SIZE RATIO,  │
│ WHEREIN THE COST BETWEEN THE BLOB      │
│ TRACKER AND THE BLOB IS USED TO        │
│ ASSOCIATE ONE OR MORE BLOB TRACKERS    │
│ WITH ONE OR MORE BLOBS                 │
│                 908                    │
└─────────────────────────────────────┘
```

FIG. 9

METHODS AND SYSTEMS OF DETERMINING COSTS FOR OBJECT TRACKING IN VIDEO ANALYTICS

CROSS-REFERENCE TO RELATED APPLICATIONS

This application claims the benefit of U.S. Provisional Application No. 62/340,724, filed May 24, 2016, which is hereby incorporated by reference, in its entirety.

FIELD

The present disclosure generally relates to video analytics, and more specifically to techniques and systems providing a content-adaptive cost function calculation for video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described that provide a content-adaptive cost function for video analytics. For example, a content-adaptive cost determination engine can determine costs between one or more blobs and one or more blob trackers. A blob represents at least a portion of one or more objects in a video frame (also referred to as a "picture"). The costs can be used to associate blob trackers with blobs. For example, a blob tracker can be associated with a blob in a video frame based on a cost between the blob tracker and the blob. A blob tracker can also be updated based on one or more costs associated with the blob tracker and one or more blobs. For example, a state, a location, and/or other characteristic of the blob tracker can be updated.

In some embodiments, the content-adaptive cost determination engine determines a distance between a blob tracker and a blob. In some aspects, the content-adaptive cost determination engine takes into account a spatial relationship between the blob tracker and the blob when calculating the distance. The spatial relationship may include whether the tracker and blob overlap in one or more dimensions. In some cases, a negative distance is introduced that indicates an overlap in multiple dimensions (e.g., in both x- and y-dimensions). For instance, when calculating a physical distance between a tracker and a blob, a negative distance is introduced to indicate the tracker-blob overlap.

In some aspects, the content-adaptive cost function takes into account a size relationship between a blob tracker and a blob. The size relationship can be used to weight the distance calculation. For example, the cost can be calculated based on a physical distance between the blob tracker and the blob (in some cases, taking into account the spatial relationship), and can be adjusted according to the sizes relationship.

According to at least one example, a method of determining costs between blob trackers and blobs is provided that includes detecting a blob in a video frame, wherein the blob includes pixels of at least a portion of a foreground object. The method further includes determining a physical distance between a blob tracker and the blob. The method further includes determining a size ratio between the blob tracker and the blob. The method further includes determining a cost between the blob tracker and the blob using the physical distance and the size ratio, wherein the cost between the blob tracker and the blob is used to associate one or more of the blob trackers with one or more of the blobs.

In another example, an apparatus is provided that includes a memory configured to store video data and a processor. The processor is configured to and can detect a blob in a video frame, wherein the blob includes pixels of at least a portion of a foreground object. The processor is configured to and can determine a physical distance between a blob tracker and the blob. The processor is configured to and can determine a size ratio between the blob tracker and the blob. The processor is configured to and can determine a cost between the blob tracker and the blob using the physical distance and the size ratio, wherein the cost between the blob tracker and the blob is used to associate one or more blob trackers with one or more blobs.

In another example, a computer readable medium is provided having stored thereon instructions that when executed by a processor perform a method that includes: detecting a blob in a video frame, wherein the blob includes pixels of at least a portion of a foreground object; determining a physical distance between a blob tracker and the blob; determining a size ratio between the blob tracker and the blob; and determining a cost between the blob tracker and the blob using the physical distance and the size ratio, wherein the cost between the blob tracker and the blob is used to associate one or more blob trackers with one or more blobs.

In another example, an apparatus is provided that includes means for detecting a blob in a video frame, wherein the blob includes pixels of at least a portion of a foreground object. The apparatus further comprises means for determining a physical distance between a blob tracker and the blob. The apparatus further comprises means for determining a size ratio between the blob tracker and the blob. The apparatus further comprises means for determining a cost between the blob tracker and the blob using the physical distance and the size ratio, wherein the cost between the blob tracker and the blob is used to associate one or more blob trackers with one or more blobs.

In some aspects, the methods, apparatuses, and computer readable medium described above further comprise associating the blob tracker with the blob based on the determined cost.

In some aspects, the methods, apparatuses, and computer readable medium described above further comprise determining a spatial relationship between the blob tracker and the blob, the spatial relationship including an amount of overlap between the blob tracker and the blob, wherein the physical distance is determined based on the spatial relationship.

In some aspects, determining the spatial relationship between the blob tracker and the blob includes determining an amount of overlap between the blob tracker and the blob in a first dimension, and determining an amount of overlap between the blob tracker and the blob in a second dimension.

In some aspects, determining the physical distance between the blob tracker and the blob includes determining a negative distance between the blob tracker and the blob when overlap is determined between the blob tracker and the blob in the first dimension and in the second dimension. In some aspects, the negative distance includes a ratio between an area of intersection of the blob tracker and the blob and an area of union of the blob tracker and the blob.

In some aspects, determining the physical distance between the blob tracker and the blob includes determining a minimum distance in the first dimension between the blob tracker and the blob, wherein the minimum distance in the first dimension is determined when overlap is determined between the blob tracker and the blob in the second dimension and no overlap is determined between the blob tracker and the blob in the first dimension.

In some aspects, determining the physical distance between the blob tracker and the blob includes determining a minimum distance in the second dimension between the blob tracker and the blob, wherein the minimum distance in the second dimension is determined when overlap is determined between the blob tracker and the blob in the first dimension and no overlap is determined between the blob tracker and the blob in the second dimension.

In some aspects, determining the cost for the blob tracker and the blob includes weighting the physical distance by the size ratio. In some aspects, the size ratio includes a ratio between an area of a tracker box associated with the blob tracker and an area of a blob box associated with the blob.

According to at least one other example, a method of determining costs between blob trackers and blobs is provided that includes detecting a blob in a video frame, wherein the blob includes pixels of at least a portion of a foreground object. The method further includes determining a spatial relationship between a blob tracker and the blob, the spatial relationship including an amount of overlap between the blob tracker and the blob. The method further includes determining a physical distance between the blob tracker and the blob, wherein the physical distance is determined based on the spatial relationship. The method further includes determining a size ratio between the blob tracker and the blob. The method further includes determining a cost between the blob tracker and the blob using the physical distance and the size ratio, wherein the cost between the blob tracker and the blob is used to associate one or more of the blob trackers with one or more of the blobs.

In another example, an apparatus is provided that includes a memory configured to store video data and a processor. The processor is configured to and can detect a blob in a video frame, wherein the blob includes pixels of at least a portion of a foreground object. The processor is configured to and can determine a spatial relationship between a blob tracker and the blob, the spatial relationship including an amount of overlap between the blob tracker and the blob. The processor is configured to and can determine a physical distance between the blob tracker and the blob, wherein the physical distance is determined based on the spatial relationship. The processor is configured to and can determine a size ratio between the blob tracker and the blob. The processor is configured to and can determine a cost between the blob tracker and the blob using the physical distance and the size ratio, wherein the cost between the blob tracker and the blob is used to associate one or more blob trackers with one or more blobs.

In another example, a computer readable medium is provided having stored thereon instructions that when executed by a processor perform a method that includes: detecting a blob in a video frame, wherein the blob includes pixels of at least a portion of a foreground object; determining a spatial relationship between a blob tracker and the blob, the spatial relationship including an amount of overlap between the blob tracker and the blob; determining a physical distance between the blob tracker and the blob, wherein the physical distance is determined based on the spatial relationship; determining a size ratio between the blob tracker and the blob; and determining a cost between the blob tracker and the blob using the physical distance and the size ratio, wherein the cost between the blob tracker and the blob is used to associate one or more blob trackers with one or more blobs.

In another example, an apparatus is provided that includes means for detecting a blob in a video frame, wherein the blob includes pixels of at least a portion of a foreground object. The apparatus further comprises means for determining a spatial relationship between a blob tracker and the blob, the spatial relationship including an amount of overlap between the blob tracker and the blob. The apparatus further comprises means for determining a physical distance between the blob tracker and the blob, wherein the physical distance is determined based on the spatial relationship. The apparatus further comprises means for determining a size ratio between the blob tracker and the blob. The apparatus further comprises means for determining a cost between the blob tracker and the blob using the physical distance and the size ratio, wherein the cost between the blob tracker and the blob is used to associate one or more blob trackers with one or more blobs.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7A-FIG. 7D are illustrations of video frames showing blob trackers and blobs without considering a spatial relationship and a size relationship.

FIG. 9 is a flowchart illustrating an embodiment of a process of processing video data, in accordance with some embodiments.

DETAILED DESCRIPTION

Figure 1:
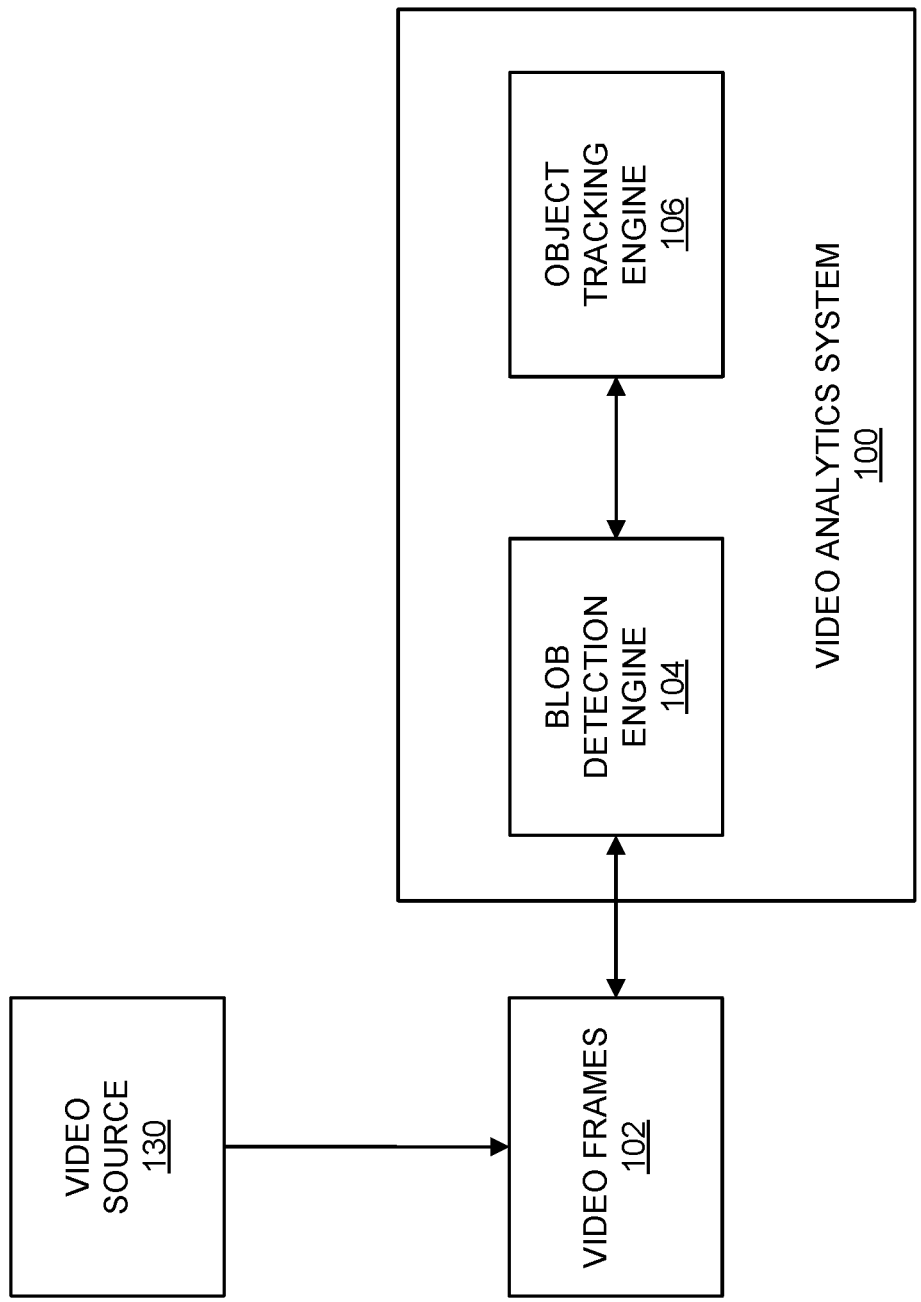
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of event of interest and sends an alert or alarm to a central control room to alert a user of the event of interest.

As noted previously, video analytics can perform object detection and object tracking to track detected objects across frames of a video sequence. A cost function can be used for object tracking to determine an object (or blob) with which to associate an object tracker (or blob tracker). Systems and methods are described herein for providing a content-adaptive cost function for video analytics.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob (e.g., blob bounding box 502 shown in FIG. 5). In some examples, a tracker can be represented by a tracker box (e.g., blob tracker 504 with the bounding box shown in FIG. 5).

As described in more detail below, blobs can be tracked using blob trackers. A blob tracker can be associated with a tracker bounding box (also referred to as a tracker box). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example).

The prediction of the location of the blob tracker in the current frame can be based on the location of the blob in the previous frame. A history or motion model can be maintained for a blob tracker, including a history of various states, a velocity, and a location for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the dimensions of a bounding box of the tracker in a current frame, with $C_{tx}$ being the width of the bounding box, and $C_{ty}$ being the height of the bounding box. The term $C_{t-1}(C_{t-1x}, C_{t-1y})$ denotes the dimensions (width and height) of a bounding box of the tracker in a previous frame. In some cases, because the timing for video frame data is constant (according to the frame rate, such as 30 frames per second, 60 frames per second, 120 frames per second, or other suitable frame rate), a time variable may not be needed in the velocity calculation. In some cases, a time constant can be used (according to the frame rate).

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3, 4, and 8.

Figure 2:
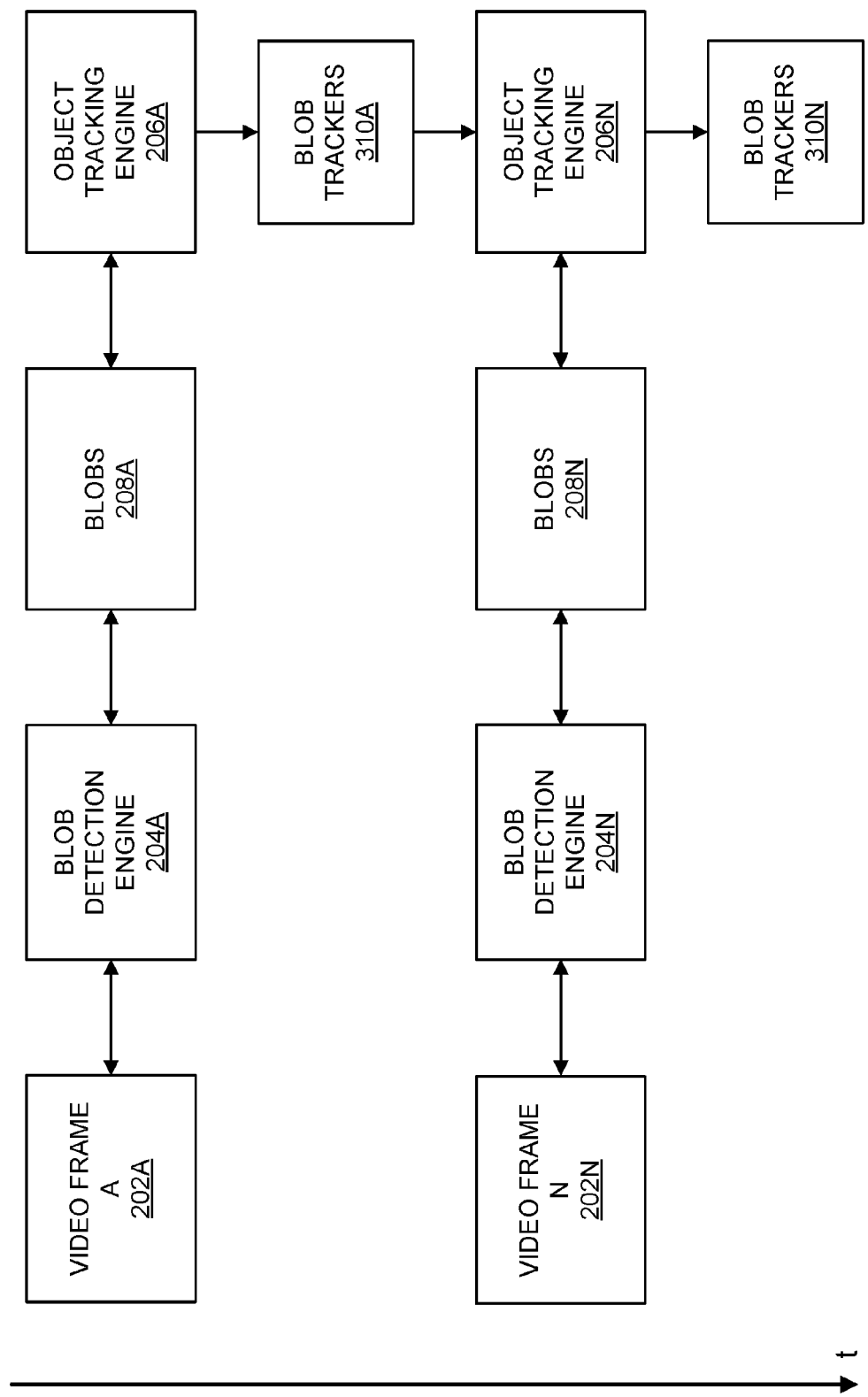
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. As described in more detail below, costs (e.g., a cost including a distance, a weighted distance, or other cost) between blob trackers and blobs can be calculated by the object tracking engine 206A. The object tracking engine 206A can perform data association to associate the blob trackers (e.g., blob trackers generated or updated based on a previous frame or newly generated blob trackers) and blobs 208A using the calculated costs (e.g., using a cost matrix or other suitable association technique). The blob trackers, including in terms of positions of the trackers, can be updated according to the data association to generate updated blob trackers 310A. For example, a blob tracker's state and location for the video frame A 202A can be calculated and updated. The blob trackers location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
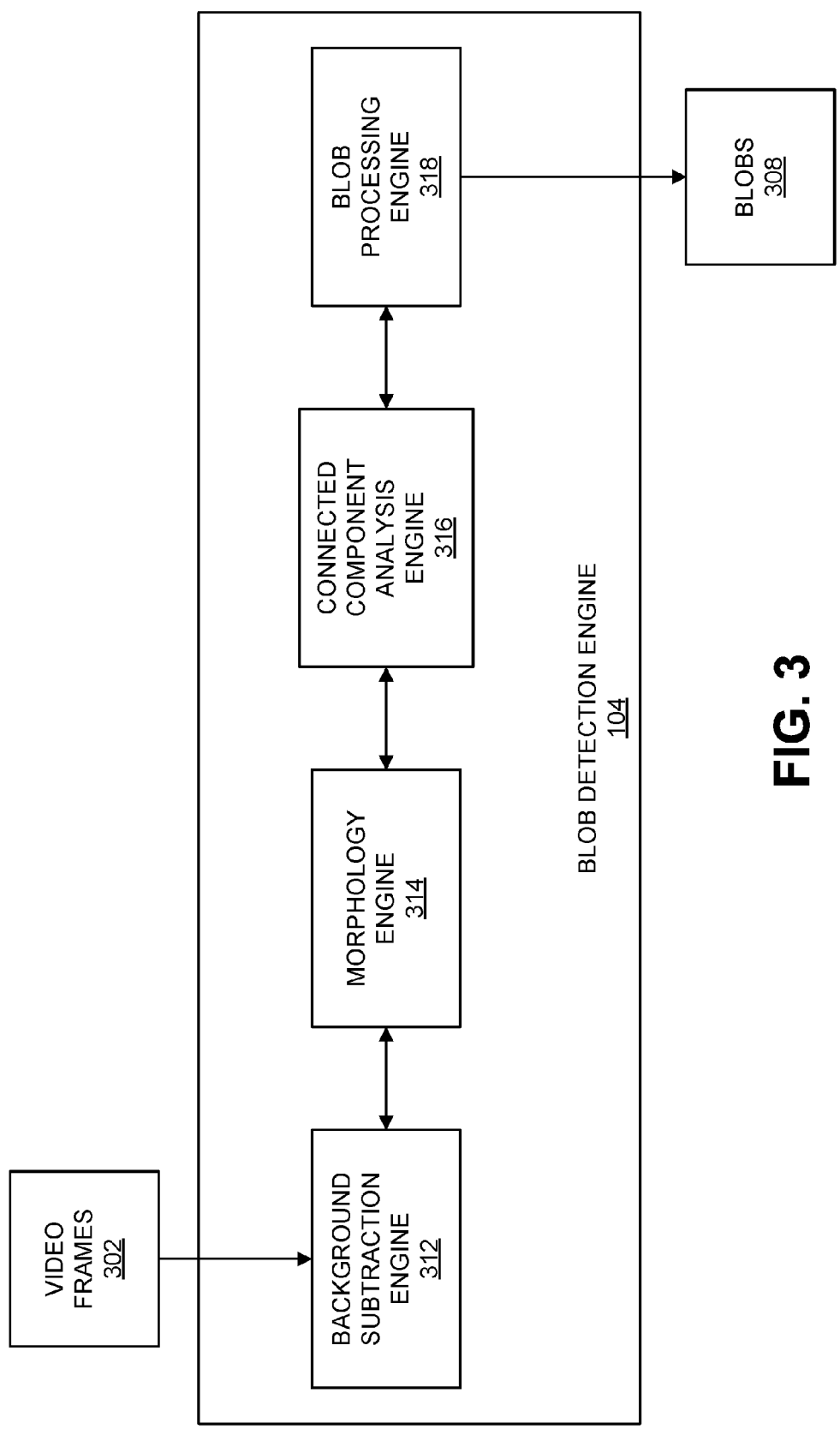
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N\left(X_t \mid \mu_{i,t}, \sum_{i,t}\right)$$

Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM changes over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of dilation functions.

An erosion function can be applied to remove pixels on object boundaries. For example, the morphology engine 314 can apply an erosion function (e.g., FilterErode3x3) to a 3x3 filter window of a center pixel, which is currently being processed. The 3x3 window can be applied to each foreground pixel (as the center pixel) in the foreground mask. One of ordinary skill in the art will appreciate that other window sizes can be used other than a 3x3 window. The erosion function can include an erosion operation that sets a current foreground pixel in the foreground mask (acting as the center pixel) to a background pixel if one or more of its neighboring pixels within the 3x3 window are background pixels. Here, the neighboring pixels of the current center pixel include the eight pixels in the 3x3 window, with the ninth pixel being the current center pixel.

A dilation operation can be used to enhance the boundary of a foreground object. For example, the morphology engine 314 can apply a dilation function (e.g., FilterDilate3x3) to a 3x3 filter window of a center pixel. The 3x3 dilation window can be applied to each background pixel (as the center pixel) in the foreground mask. One of ordinary skill in the art will appreciate that other window sizes can be used other than a 3x3 window. The dilation function can include a dilation operation that sets a current background pixel in the foreground mask (acting as the center pixel) as a foreground pixel if one or more of its neighboring pixels in the 3x3 window are foreground pixels. The neighboring pixels of the current center pixel include the eight pixels in the 3x3 window, with the ninth pixel being the current center pixel. In some examples, multiple dilation functions can be applied after an erosion function is applied. In one illustrative example, three function calls of dilation of 3x3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3x3 window size is called first, and three function calls of dilation of 3x3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

for each pixel of the foreground mask {
   if it is a foreground pixel and has not been processed, the following steps apply:
      Apply FloodFill function to connect this pixel to other foreground and generate a connected component
      Insert the connected component in a list of connected component.
      Mark the pixels in the connected component as being processed}

The Floodfill (seed fill) function is an algorithm that determines the area connected to a seed node in a multi-dimensional array (e.g., a 2-D image in this case). This function first obtains the color/intensity value at the seed position (e.g., a foreground pixel) of the source foreground mask, and then finds all the neighbor pixels that have the same (or similar) value based on 4 or 8 connectivity. For example, in 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
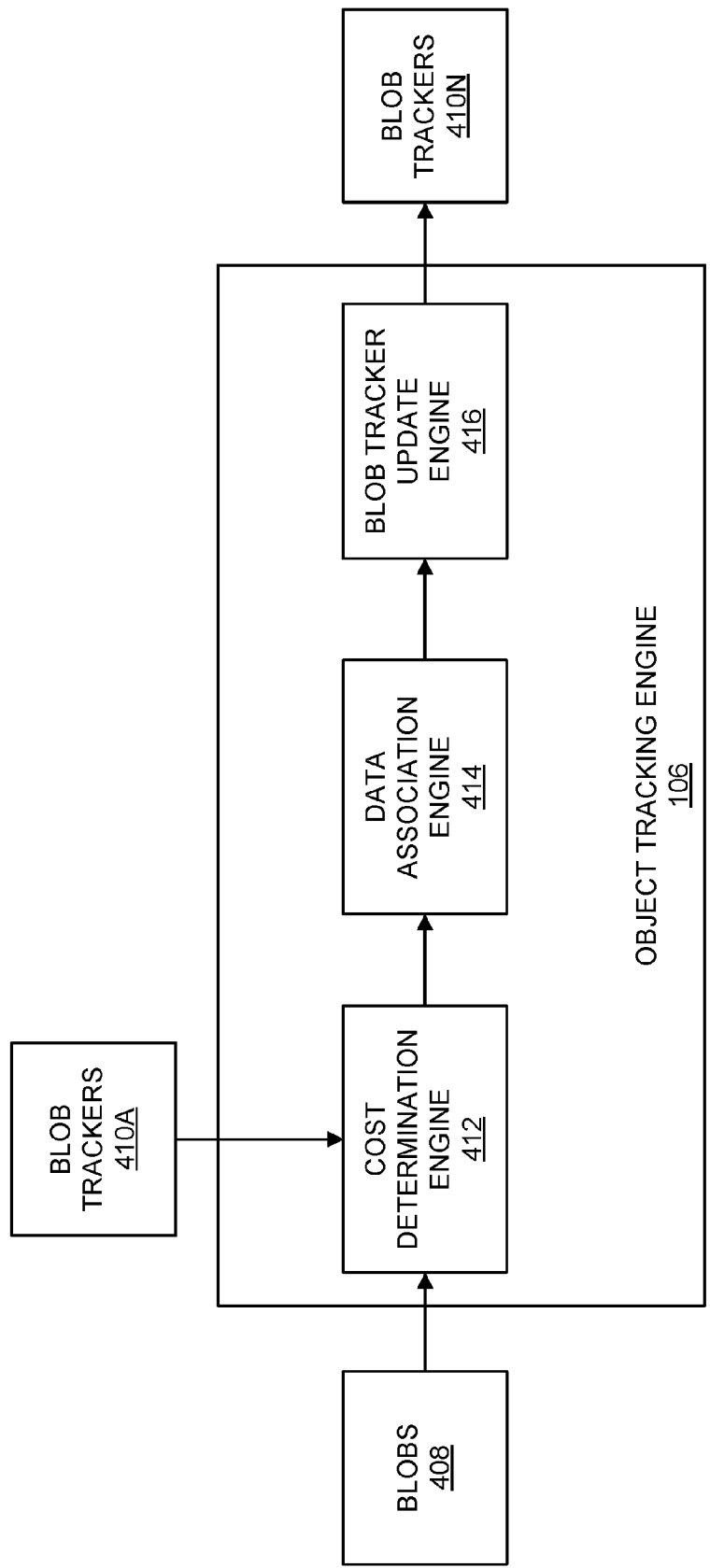
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A. Further details related to the cost determination engine 412 are described below.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicated from a previous frame (e.g., using a location of a blob associated with the blob tracker in the previous frame). The calculated distance between the identified blobs and estimated trackers are used for data association. After the data association for the current frame, the tracker location in the current frame can be identified with its associated blob(s)' location in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can includes the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other object of interest) intersect, the two trackers associated with the two objects will be merged together for certain frames, and the merge or occlusion status needs to be recorded for high level video analytics.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker and output as an identified tracker-blob pair. A tracker-blob pair is output at the system level as an event (e.g., presented as a tracked object on a display, output as an alert, or other suitable event) when the tracker is promoted to be a normal tracker. A tracker that is not promoted as a normal tracker can be removed (or killed), after which the tracker can be considered as dead.

As previously described, the object tracking engine 106 uses costs between blob trackers 410A and blobs 408 to perform data association between the trackers 410A and blobs 408. Due to challenging cases, such as cluttered backgrounds, unpredictable occlusions, missing blob detections, or the like, a robust cost function is critical to correctly associate the trackers 410A and blobs 408 and also to update the trackers 410A. Correct association of trackers and blobs and updating of trackers combine to maintain the correct object tracking along the time sequence of a video. Therefore, calculating a cost using a robust cost function approach is needed.

Traditional cost functions determine, for each tracker and blob, a cost as a distance between a centroid of a tracker and a centroid of a blob. For example, one method to measure a cost between the tracker and the blob is to calculate the Euclidean distance between the centroid of a tracker box (e.g., tracker 504 shown in FIG. 5) and the centroid of a bounding box of a blob (e.g., blob bounding box 502 shown in FIG. 5). This type of cost determination is referred to herein as a centroid-based cost function or determination. In a 2-D video sequence, a centroid-based cost function is calculated as below:

$$Cost_{tb} = \sqrt{(t_x - b_x)^2 + (t_y - b_y)^2}$$

The terms $(t_x, t_y)$ and $(b_x, b_y)$ are the center location of the tracker and blob bounding boxes, respectively. This method has been widely applied for calculating the cost function for data association. Another cost function approach uses the minimum distance in X direction or Y direction to calculate the cost. These methods may be used for certain controlled scenarios such as well-aligned lane conveying, but are not a robust method for a large volume of video sequences in various field cases.

Figure 5:
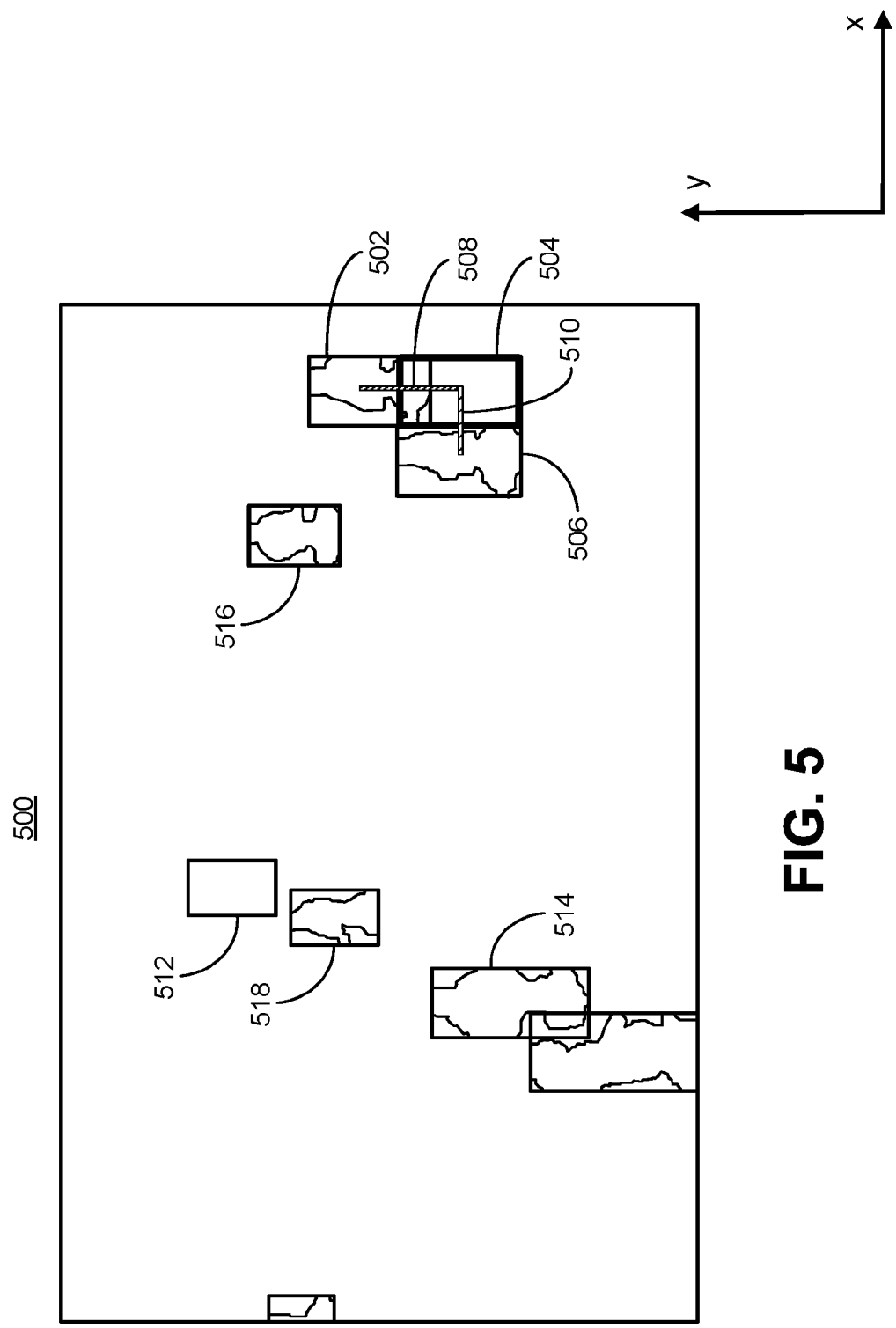
FIG. 5 is an illustration of a video frame showing a distance between a blob tracker and a blob without considering a spatial relationship.

A simple cost function calculation approach for object tracking may cause various problems with regard to object tracking. In one example, simply calculating the distance between the centroid of a tracker box and a blob box may not be able to reflect the real physical distance between the tracker and blob, as the distance calculation fails to consider the spatial layout and size relationship of the tracker and the blobs. For example, as illustrated in FIG. 5, a blob tracker 504 location in frame 500 is shown by a rectangular tracker bounding box, and various blobs are bounded by rectangular blob bounding boxes, including blob bounding box 502. As illustrated, even when the tracker 504 and the upper blob with bounding box 502 are overlapping, which suggests a good match, the cost between the tracker 504 and the upper blob with bounding box 502 (magnitude denoted by line 508) could be larger than the cost between the tracker 504 and its left blob with bounding box 506 (magnitude denoted by line 510) when using the centroid-based distance approach described above.

Figure 6:
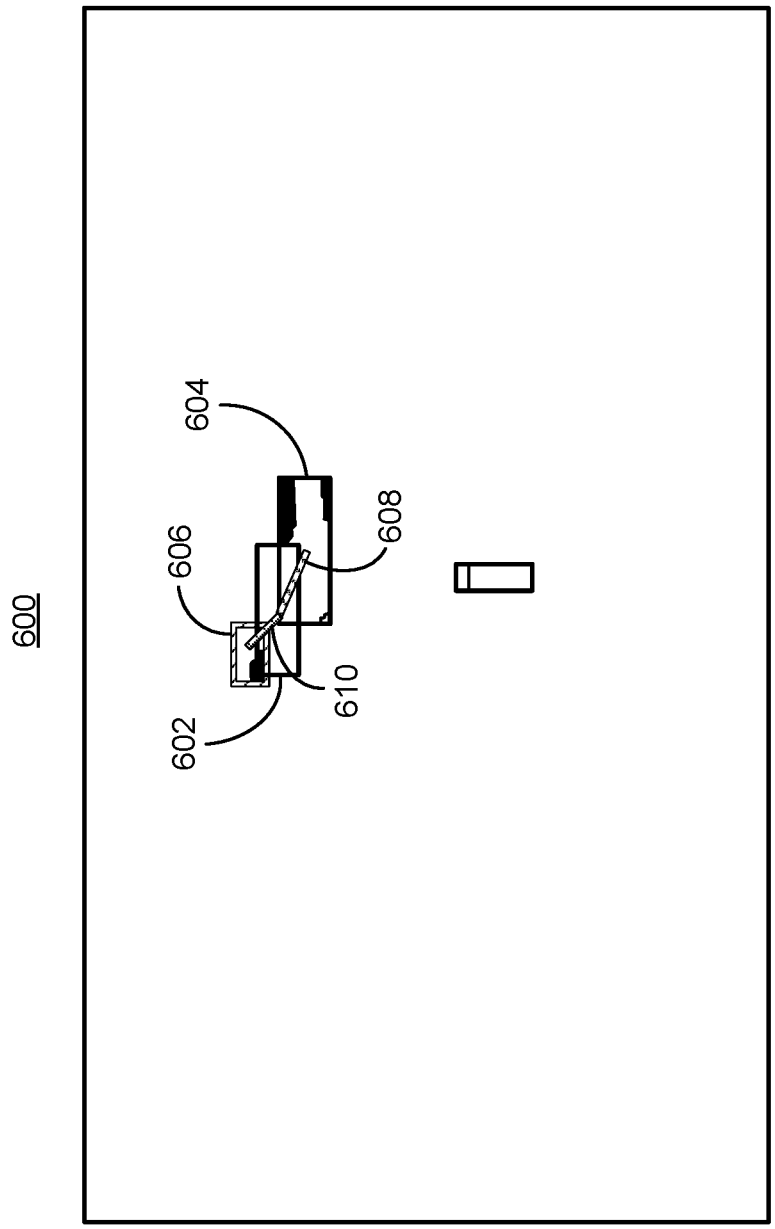
FIG. 6 is an illustration of a video frame showing a distance between a blob tracker and a blob without considering a size relationship.

In another example, by not considering the size relationship of the tracker and blob, the centroid-based cost determination may fail to associate the corresponding blobs with a blob tracker simply because the Euclidean distance is calculated as the cost. As described herein, the size relationship between a blob tracker and a blob can be a good indicator for the data association, and should be considered in the cost calculation. As shown in FIG. 6, the tracker 602 shown with the tracker bounding box has very similar size with its lower blob with bounding box 604. However, because the distance 608 between the tracker 602 and the blob with bounding box 604 is larger than the distance 610 between the tracker 602 and the smaller blob with bounding box 606 above the tracker, the cost determined using the centroid based-distance does not reflect the size relationship between the tracker 602 and blobs, and thus fails to associate the correct blob with the tracker 602.

In yet another example, if the background is too noisy, the blob detection engine 104 may generate certain blobs that can be considered as noise blobs. By nature, the noise blobs may change size and location dramatically between frames, and by simply calculating the centroid distance as the cost, generation of noise blobs as blobs may cause a tracker to keep tracking noise, which may draw a false positive in the video system. A cost function that considers spatial layout and size change can eliminate such a noisy tracker. As shown in FIG. 7A-FIG. 7D, the size and spatial layout of the two pedestrian on the left side (shown by blobs with bounding boxes 702 and 704) are consistent in the four consecutive frames 700A-700D. However, on the right side of the frames 700A-700D, noise blobs with bounding boxes 706 and 708 are caused by waving leaves changing dramatically in size and spatial layout in the scene. The generation of the noise blobs can cause a large cost, such as increasing a false positive rate in object tracking.

Tracking multiple objects in various ranges of video contents is a critical yet challenging problem for video analytics. Because both data association and the tracker update process rely on the cost function calculation, a robust cost function is critical in performing accurate association between the trackers and blobs and in updating the trackers, which combine to maintain the correct object tracking along a video sequence.

Embodiments of a cost function calculation for object tracking in video analytics is described herein. The proposed techniques can be used to determine a cost between two objects, such as a blob tracker and a blob being represented as bounding boxes. As noted previously, a cost can include the distance between a centroid of a blob of a current frame and a centroid of a blob tracker that has been updated from the last frame. However, various problems exist with such a centroid-based cost function. The embodiments described herein include methods and systems that provide a content-adaptive cost function for object tracking in video analytics. The content-adaptive cost function takes into account a spatial relationship between a tracker and a blob when calculating a distance. The spatial relationship may include whether the tracker and blob overlap in one or more dimensions. A negative distance is introduced that indicates an overlap in multiple dimensions (e.g., in both x- and y-dimensions). For instance, when calculating a physical distance between a tracker and a blob, a negative distance is introduced to allow the indication of the tracker-blob overlap. The content-adaptive cost function can also take into account a size relationship between a blob tracker and a blob. The size relationship can be used to weight the distance calculation. For example, the cost can be calculated based on a physical distance between the blob tracker and the blob (in some cases, taking into account the spatial relationship), and can be adjusted according to the size relationship.

Figure 8:
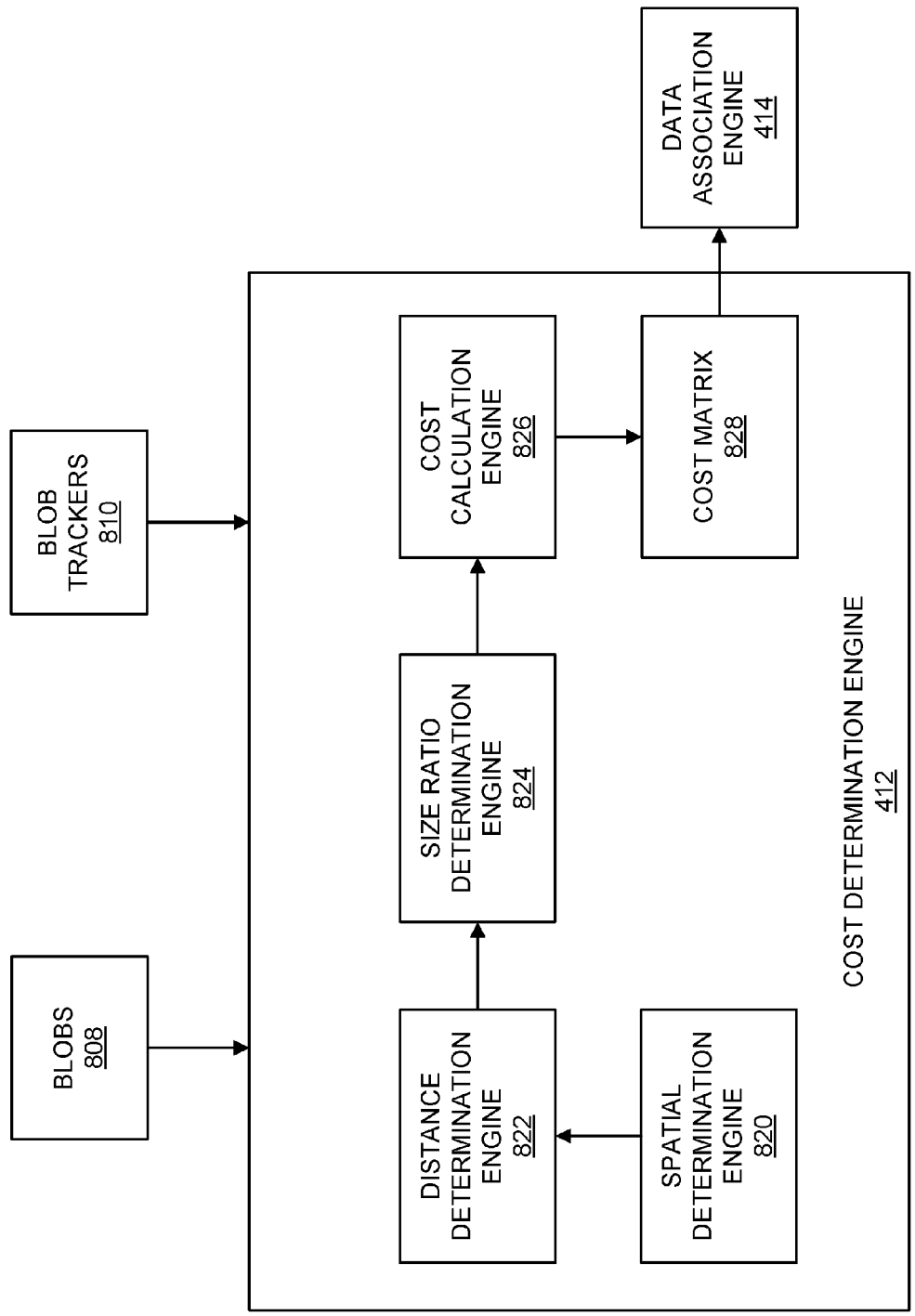
FIG. 8 is a block diagram illustrating an example of a cost determination engine, in accordance with some embodiments.

FIG. 8 is a block diagram illustrating an example of a cost determination engine 412 that can implement a content-adaptive cost function. The cost determination engine 412 takes into account size relationships between blob trackers and blobs when determining costs between the blob trackers and blobs. The cost determination engine 412 can also determine spatial relationships between the blob trackers and the blobs. The spatial relationship for a blob tracker and a blob can be used when calculating a distance between the blob tracker and the blob, which is then used to determine the cost for the blob tracker and the blob.

A spatial determination engine 820 obtains the blobs 808 and the blob trackers 810, and can compare the bounding box of each blob tracker to the bounding box of each blob to determine a spatial relationship between each tracker bounding box and each blob bounding box. A spatial relationship may include whether a tracker bounding box and a blob bounding box overlap in one or more dimensions. One of ordinary skill in the art will appreciate that other spatial commonalities between a tracker bounding box and a blob bounding box can be used to determine a distance between the bounding boxes.

In some examples, the spatial determination engine 820 can implement the cost function to determine an overlap between a blob tracker bounding box and a blob bounding box in the x-dimension and in the y-dimension. Any suitable technique or calculation can be used to determine whether and how much the bounding boxes of the blob tracker and the blob overlap. In one illustrative example, an overlap between a tracker box (t) and a blob box (b) in the x-dimension can be denoted as $olpX_{tb}$ (or olpX) and an overlap in the y-dimension can be denoted as $olpY_{tb}$ (or olpY). In such an example, the amount of overlap in each dimension can be determined as:

$$olpX_{tb} = \begin{cases} \max(0, \min(bR - tL, tR - tL)), & tL \geq bL \\ \max(0, \min(tR - bL, tR - tL)), & tR \leq bR \\ bR - bL, & \text{otherwise} \end{cases}$$

$$olpY_{tb} = \begin{cases} \max(0, \min(bB - tT, tB - tT)), & tT \geq bT \\ \max(0, \min(tB - bT, tB - tT)), & tB \leq bB \\ bB - bT, & \text{otherwise} \end{cases}$$

Where bL, bR, bT and bB are the left, right, top, and bottom coordinates of the bounding box of a blob, respectively, and where tL, tR, tT and tB are the corresponding left, right, top, and bottom coordinates of the tracker bounding box. The coordinates can be located at any point on the bounding box. In one illustrative example, the left coordinate (bL or tL) of a bounding box can be located at the center of the left side of the bounding box, the right coordinate (bR or tR) of a bounding box can be located at the center of the right side of the bounding box, the top coordinate (bT or tT) of a bounding box can be located at the center of the top side of the bounding box, and the bottom coordinate (bB or tB) of a bounding box can be located at the center of the bottom side of the bounding box.

Reference can be made to FIG. 5 to illustrate overlapping and non-overlapping bounding boxes of trackers and blobs. As shown in FIG. 5, the bounding box of the blob tracker 504 is overlapping with the blob bounding box 502 in an x-dimension and in a y-dimension (as illustrated by the x- and y-axes). For the x-dimension overlap determination (olpX$_{tb}$) between the blob tracker 504 and the blob bounding box 502, either of the max(0,min(tR−tL,tR−tL)) or the max(0,min(tR−bL,tR−tL)) calculations can be used because the tL≥bL condition is met (the left coordinate of the tracker 504 box is equal to the left coordinate of the blob bounding box 502) and the tR≤bR condition is met (the right coordinate of the tracker 504 box is equal to the right coordinate of the blob bounding box 502). Both conditions are met because the bounding box of the blob tracker 504 is fully overlapped in the x-dimension with the blob bounding box 502, resulting in both calculations providing the same overlap amount. For the y-dimension overlap determination (olpY$_{tb}$) between the blob tracker 504 box and the blob bounding box 502, the max(0,min(tB−bT,tB−tT)) calculation can be used because the condition tB≤bB is satisfied (the bottom of the tracker 504 box is less than the bottom of the blob bounding box 502).

As further shown in FIG. 5, the bounding box of the blob tracker 512 and the blob bounding box 514 do not overlap in either the x-dimension or the y-dimension. A comparison of the blob tracker 512 bounding box and the blob bounding box 514 would result in a 0 value for the olpX$_{tb}$ and olpY$_{tb}$ overlap determinations, indicating that no overlap is present in either dimension. As another example, the bounding box of the blob tracker 512 and the blob bounding box 516 overlap in the y-dimension but do not overlap in the x-dimension, resulting in a 0 value for the olpX$_{tb}$ overlap determination. For the y-dimension overlap determination (olpY$_{tb}$) between the blob tracker 512 bounding box and the blob bounding box 516, the max(0,min(bB−tT,tB−tT)) calculation can be used because the condition tT≥bT is satisfied (the top of the tracker 512 box is greater than the top of the blob bounding box 516). Similar overlap determinations can be made for each tracker-blob pair in the frame 500.

A distance determination engine 822 can determine a physical distance between a blob tracker and a blob. For example, the physical distance can be a distance between the bounding box of the blob tracker and the bounding box of the blob. In some embodiments, a centroid-based distance determination can be used (as previously described). In some embodiments, a distance determination can be based on the spatial relationship described above, such as the olpX$_{tb}$ and olpY$_{tb}$ overlap determinations. One of ordinary skill in the art will appreciate that other techniques for determining a distance can be used. Regardless of how the distance is determined, the distance can be weighted (or otherwise adjusted) using a size ratio, as described in more detail below.

In examples in which a physical distance between a tracker and a blob is determined based on a spatial relationship between the tracker and blob, the distance can be determined after the spatial relationship is determined. In such examples, the physical distance can be determined as:

$$dist_{tb} = \begin{cases} \sqrt{\min(abs(bR-tL), abs(bL-tR))^2 + \min(abs(bT-tB), abs(bB-tT))^2}, & olpX=0 \text{ and } olpY=0 \\ \min(abs(bR-tL), abs(bL-tR)), & olpX=0 \text{ and } olpY>0 \\ \min(abs(bT-tB), abs(bB-tT)), & olpX>0 \text{ and } olpY=0 \\ -\dfrac{olpX * olpY}{(\max(bR, tR) - \min(bL, tL)) * (\max(bT, tT) - \min(bB, tB))}, & \text{otherwise} \end{cases}$$

Calculation of the distance (dist$_{tb}$) depends on the spatial relationship olpX and olpY. When a tracker and blob do not overlap in at least one dimension (the first three equations in the dist$_{tb}$ determination above), the determined distance should be larger than 0. For example, if there is no overlap between a tracker bounding box and a blob bounding box in either dimension (olpX=0 and olpY=0), the distance is calculated as the square root of the sum of the minimum distance in the x-dimension and the minimum distance in the y-dimension, as shown by the illustrative calculation $$\sqrt{\min(abs(bR-tL), abs(bL-tR))^2 + \min(abs(bT-tB), abs(bB-tT))^2}.$$

When the tracker bounding box and blob bounding box overlap in either x- or y-dimension (but not both), the distance is 0 in the overlapping dimension (due to no positive distance being between the boxes in that dimension). A distance between the tracker bounding box and blob bounding box is calculated in the non-overlapping dimension. For example, when the tracker bounding box and blob bounding box are overlapping in the y-dimension and are not overlapping in the x-dimension (olpX=0 and olpY>0), as shown by the tracker 512 bounding box and blob bounding box 516 in FIG. 5, the minimum distance between the tracker bounding box and the blob bounding box in the x-dimension is determined. Using the calculation min(abs(bR−tL),abs(bL−tR)), the minimum distance can be determined as the shortest distance between either the distance between the right coordinate of the blob bounding box (bR) and the left coordinate of the tracker bounding box (tL) or the distance between the left coordinate of the blob bounding box (bL) and the right coordinate of the tracker bounding box (tR). In the example shown in FIG. 5, the shortest distance will be between the left coordinate of the blob bounding box 516 and the right coordinate of the tracker 512 bounding box.

In another example, when the tracker bounding box and blob bounding box are overlapping in the x-dimension and are not overlapping in the y-dimension (olpX>0 and olpY=0), as shown by the tracker 512 bounding box and blob bounding box 518 in FIG. 5, the minimum distance between the tracker bounding box and the blob bounding box in the y-dimension is determined. Using the calculation min(abs(bT−tB),abs(bB−tT)), the minimum distance can be determined as the shortest distance between either the distance between the top coordinate of the blob bounding box (bT) and the bottom coordinate of the tracker bounding box (tB) or the distance between the bottom coordinate of the blob bounding box (bB) and the top coordinate of the tracker bounding box (tT). In the example shown in FIG. 5, the shortest distance will be between the top coordinate of the blob bounding box 518 and the bottom coordinate of the tracker 512 bounding box.

A negative distance is introduced to indicate when a tracker and blob overlap in multiple dimensions. For example, when the tracker and blob are overlapping in both the x- and y-dimensions (e.g., the blob tracker 504 bounding box and the blob bounding box 502), the distance becomes negative. The magnitude of the negative distance can include the ratio between the area of intersection over the area of union between a blob tracker bounding box and a blob bounding box. Using such a magnitude calculation, the minimum distance between the tracker bounding box and blob bounding box is −1 when they are fully overlapped, and between 0 and −1 when the tracker bounding box and blob bounding box are not fully overlapped.

For example, using the calculation $$-\frac{olpX * olpY}{(\max(bR, tR) - \min(bL, TL)) * (\max(bT, tT) - \min(bB, tB))}$$

when there is overlap in both x- and y-dimensions (the "otherwise" condition is met), the negative distance is determined as the ratio between the area of intersection between the blob bounding box and tracker bounding box (amount of overlap in x- and y-dimensions) divided by the area of union between the tracker bounding box and the blob bounding box. Using the tracker 504 bounding box and the blob bounding box 502 as an example, the calculation becomes either $$-\frac{olpX * olpY}{(bR - tL)*(bT - tB)} \text{ or } -\frac{olpX * olpY}{(tR - bL)*(bT - tB)}.$$

Note that because the tracker 504 bounding box and the blob bounding box 502 are fully overlapped in the x-dimension, either (bR−tL) or (tR−bL) can be used in the denominator.

The content-adaptive cost function performed by the cost determination engine 412 can also take into account a size relationship between a tracker and a blob. For example, the cost between a blob tracker bounding box and a blob bounding box can be determined by adjusting the physical distance between the tracker bounding box and the blob bounding box, however determined, based on a size relationship between the bounding boxes. The size relationship can include a size ratio between the tracker bounding box and the blob bounding box, which can act as a weight factor. For example, the size ratio determination engine 824 can determine a size ratio between a blob tracker bounding box and a blob bounding box. The cost calculation engine 826 can then determine a cost using the size ratio. For example, a physical distance between the tracker bounding box and the blob bounding box determined by the distance determination engine 822 (e.g., taking into account the spatial relationship) can be obtained, and the cost between the bounding boxes can be determined by multiplying the physical distance by the size ratio. In some cases, if the area of the tracker is smaller, the weighted cost calculation can be 1 over the ratio to make the resulting cost always not greater or equal to 1.

In one illustrative example, a cost based on a distance and size ratio can be determined as:

$$Cost_{tb} = \begin{cases} dist_{tb} * \frac{\max(tW * tH, bW * bH)}{\min(tW * tH, bW * bH)}, & dist_{tb} \geq 0 \\ dist_{tb} * \frac{\min(tW * tH, bW * bH)}{\max(tW * tH, bW * bH)}, & dist_{tb} < 0 \end{cases}$$

Where bW and bH are the width and height of the blob box and tW and tH are the width and height of the tracker box. As shown by the $Cost_{tb}$ calculation, the size relationship is a size ratio between a tracker bounding box and a blob bounding box. The calculation changes based on whether the distance is 0 or positive ($dist_{tb} \geq 0$) or whether the distance is negative ($dist_{tb} < 0$). In some embodiments, the distance ($dist_{tb}$) can be used as the cost, without taking into account the size ratio. Using FIG. 6 as an example, the size of the tracker 602 bounding box is larger than the blob bounding box 606, and is similar in size to the blob bounding box 604. While the distance 610 between the tracker 602 bounding box and the blob bounding box 606 is shorter than the distance 608 between tracker 602 bounding box and the blob bounding box 604, the size ratio can be used to weight the distance determinations and more accurately determine the costs. Accordingly, costs that more accurately represent the relationships between the trackers and blobs can be calculated.

The cost for each blob tracker-blob pair can be put into a cost matrix 828. The cost matrix can be provided to the data association engine 414, which can perform data association between the trackers and blobs, as described above. For example, the cost matrix 828 can be a 2-dimensional matrix, with one dimension being the blob trackers 810 and the second dimension being the blobs 808. Best matches between the trackers 810 and blobs 808 can be determined by identifying the lowest cost tracker-blob pairs in the matrix 828. A blob tracker is then associated with the blob for which it has the lowest cost in the cost matrix 828.

The content-adaptive cost function can be evaluated in an end-to-end IP camera system. For example, a multi-object tracking rate can be evaluated using the content-adaptive cost function and a centroid-based distance as a cost. Results of the performance of the proposed method compared to the centroid-based method are shown below in Table 1.

TABLE 1

Comparisons between the proposed method and simple morphology method.

| Test Sequence ID | Content-Adaptive tracking rate | Centroid-Based tracking rate |
|---|---|---|
| 1 | 0.8568 | 0.3323 |
| 2 | 0.6366 | 0.5872 |
| 3 | 0.6119 | 0.5237 |
| 4 | 0.6496 | 0.648 |
| average | 0.688725 | 0.5228 |
| comparison | 31.74% | |

In table 1, the test sequences with id 1 through 4 are: pedestrian_detection, ipcva_20150908142345, VIRAT_S_000201_02_000590_000623 and ipcva_20150914113845. As shown above, the tracking rate and detection rate have both been significantly improved. A test of 9 sequences of various scenarios and the average improvement in the tracking rate improvement is 8.45%. The comparison has all the same video analytics components, except for the cost determination components. In some cases, setting $Cost_{tb}$ to be just equal to $dist_{tb}$ (not using the size ratio as a weight factor) can lead to an increase in false positive rate as compared to the centroid-based cost. By further adjusting the cost function based on the size ratio of the current tracker and the current bounding box, the average false positive rate is reduced by 10% more.

FIG. 9 illustrates an embodiment of a process 900 of processing video data. In some aspects, the process 900 may be performed by a computing device or an apparatus, such as the video analytics system 100 shown in FIG. 1. For example, the computing device or apparatus may include a processor, microprocessor, microcomputer, or other component of a device that is configured to carry out the steps of process 900. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 900 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 902, the process 900 includes detecting a blob in a video frame. The blob includes pixels of at least a portion of a foreground object. In some examples, a blob bounding box is associated with the blob. The blob can be detected using any suitable technique, such as those described herein. For example, the blob detection engine 104 can detect the blob in the video frame using background subtraction, morphology operations, and connected component analysis. In some examples, blob processing can also be performed.

At 904, the process 900 includes determining a physical distance between a blob tracker and the blob. In some examples, the physical distance can be determined between a bounding box of the blob (or blob box) and a bounding box of the blob tracker (or tracker box).

At 906, the process 900 includes determining a size ratio between the blob tracker and the blob. In some examples, the size ratio includes a ratio between an area of a tracker box associated with the blob tracker and an area of a blob box associated with the blob.

At 908, the process 900 includes determining a cost between the blob tracker and the blob using the physical distance and the size ratio. The cost between the blob tracker and the blob is used to associate one or more of the blob trackers with one or more of the blobs. For example, the process 900 can include associating the blob tracker with the blob based on the determined cost. Association of blob trackers with blobs can be done using any suitable technique, such as using a cost matrix. In some examples, determining the cost for the blob tracker and the blob includes weighting the physical distance by the size ratio.

In some embodiments, the process 900 further includes determining a spatial relationship between the blob tracker and the blob. The spatial relationship includes an amount of overlap between the blob tracker and the blob. In such examples, the physical distance between the blob tracker and the blob is determined based on the spatial relationship. In some cases, the spatial relationship is determined between a bounding box of the blob tracker and a bounding box of the blob.

In some examples, determining the spatial relationship between the blob tracker and the blob includes determining an amount of overlap between the blob tracker and the blob in a first dimension, and determining an amount of overlap between the blob tracker and the blob in a second dimension.

In some aspects, determining the physical distance between the blob tracker and the blob includes determining a negative distance between the blob tracker and the blob when overlap is determined between the blob tracker and the blob in the first dimension and in the second dimension. In some cases, the negative distance includes a ratio between an area of intersection of the blob tracker and the blob and an area of union of the blob tracker and the blob.

In some aspects, determining the physical distance between the blob tracker and the blob includes determining a minimum distance in the first dimension between the blob tracker and the blob. The minimum distance in the first dimension is determined when overlap is determined between the blob tracker and the blob in the second dimension and no overlap is determined between the blob tracker and the blob in the first dimension.

In some aspects, determining the physical distance between the blob tracker and the blob includes determining a minimum distance in the second dimension between the blob tracker and the blob. The minimum distance in the second dimension is determined when overlap is determined between the blob tracker and the blob in the first dimension and no overlap is determined between the blob tracker and the blob in the second dimension.

As described above, some embodiments of the process 900 can include determining the cost between the blob tracker and the blob based only on the physical distance and the size ratio, without considering the spatial relationship between the blob tracker and the blob. In other embodiments, the cost between a blob and a blob tracker can be determined considering the spatial relationship between the blob tracker and blob, and without considering the size relationship.

In some embodiments, a method of determining costs between blob trackers and blobs is provided that considers the spatial relationship between a blob tracker and a blob as well as the size relationship between the blob tracker and the blob. For example, the process can include detecting a blob in a video frame, similar to that of process 900. The blob includes pixels of at least a portion of a foreground object. The process further includes determining a spatial relationship between a blob tracker and the blob. The spatial relationship includes an amount of overlap between the blob tracker and the blob. The process further includes determining a physical distance between the blob tracker and the blob. The physical distance is determined based on the spatial relationship. The process further includes determining a size ratio between the blob tracker and the blob, and determining a cost between the blob tracker and the blob using the physical distance and the size ratio. The cost between the blob tracker and the blob is used to associate one or more of the blob trackers with one or more of the blobs.

The content-adaptive cost determination techniques discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of determining costs between blob trackers and blobs, the method comprising:
   detecting a blob in a video frame, wherein the blob includes pixels of at least a portion of a foreground object in the video frame;
   determining a spatial relationship between a blob tracker and the blob, the spatial relationship including an overlap between the blob tracker and the blob in at least one or more of a first dimension or a second dimension;
   determining a physical distance between the blob tracker and the blob based on the spatial relationship, wherein calculation of the physical distance depends on whether the blob tracker and the blob overlap in the first dimension, in the second dimension, or in both the first dimension and the second dimension; and
   determining a cost between the blob tracker and the blob using the physical distance, wherein the costs between the blob trackers and the blobs are used to associate one or more of the blob trackers with one or more of the blobs.

2. The method of claim 1, wherein the spatial relationship includes an overlap between the blob tracker and the blob in at least one or more of a first dimension or a second dimension, and wherein calculation of the physical distance depends on whether the blob tracker and the blob overlap in the first dimension, in the second dimension, or in both the first dimension and the second dimension.

3. The method of claim 2, wherein the spatial relationship includes an overlap between the blob tracker and the blob in the first dimension and the second dimension.

4. The method of claim 3, wherein determining the physical distance between the blob tracker and the blob includes:
   determining a negative distance between the blob tracker and the blob based on the spatial relationship including the overlap between the blob tracker and the blob in the first dimension and the second dimension.

5. The method of claim 4, wherein the negative distance includes a comparison between an area of intersection of the blob tracker and the blob and an area of union of the blob tracker and the blob.

6. The method of claim 2, wherein determining the physical distance between the blob tracker and the blob includes:
determining a minimum distance in the first dimension between the blob tracker and the blob, wherein the minimum distance in the first dimension is determined when the spatial relationship includes an overlap between the blob tracker and the blob in the second dimension and no overlap between the blob tracker and the blob in the first dimension.

7. The method of claim 2, wherein determining the physical distance between the blob tracker and the blob includes:
determining a minimum distance in the second dimension between the blob tracker and the blob, wherein the minimum distance in the second dimension is determined when the spatial relationship includes an overlap between the blob tracker and the blob in the first dimension and no overlap between the blob tracker and the blob in the second dimension.

8. The method of claim 1, further comprising:
determining a size ratio between the blob tracker and the blob; and
wherein determining the cost for the blob tracker and the blob includes weighting the physical distance by the size ratio.

9. The method of claim 8, wherein the size ratio includes a comparison between an area of a tracker bounding box associated with the blob tracker and an area of a blob bounding box associated with the blob.

10. An apparatus comprising:
a memory configured to store video data; and
a processor configured to:
detect a blob in a video frame, wherein the blob includes pixels of at least a portion of a foreground object in the video frame;
determine a spatial relationship between a blob tracker and the blob, the spatial relationship including an overlap between the blob tracker and the blob in at least one or more of a first dimension or a second dimension;
determine a physical distance between the blob tracker and the blob based on the spatial relationship, wherein calculation of the physical distance depends on whether the blob tracker and the blob overlap in the first dimension, in the second dimension, or in both the first dimension and the second dimension; and
determine a cost between the blob tracker and the blob using the physical distance, wherein costs between blob trackers and blobs are used to associate one or more of the blob trackers with one or more of the blobs.

11. The apparatus of claim 10, wherein the processor is further configured to associate the blob tracker with the blob based on the determined cost.

12. The apparatus of claim 10, wherein the spatial relationship includes an overlap between the blob tracker and the blob in the first dimension and the second dimension.

13. The apparatus of claim 12, wherein determining the physical distance between the blob tracker and the blob includes:
determining a negative distance between the blob tracker and the blob based on the spatial relationship including the overlap between the blob tracker and the blob in the first dimension and the second dimension.

14. The apparatus of claim 13, wherein the negative distance includes a comparison between an area of intersection of the blob tracker and the blob and an area of union of the blob tracker and the blob.

15. The apparatus of claim 10, wherein determining the physical distance between the blob tracker and the blob includes:
determining a minimum distance in the first dimension between the blob tracker and the blob, wherein the minimum distance in the first dimension is determined when the spatial relationship includes an overlap between the blob tracker and the blob in the second dimension and no overlap between the blob tracker and the blob in the first dimension.

16. The apparatus of claim 10, wherein determining the physical distance between the blob tracker and the blob includes:
determining a minimum distance in the second dimension between the blob tracker and the blob, wherein the minimum distance in the second dimension is determined when the spatial relationship includes an overlap between the blob tracker and the blob in the first dimension and no overlap between the blob tracker and the blob in the second dimension.

17. The apparatus of claim 10, further comprising:
determining a size ratio between the blob tracker and the blob; and
wherein determining the cost for the blob tracker and the blob includes weighting the physical distance by the size ratio.

18. The apparatus of claim 17, wherein the size ratio includes a comparison between an area of a tracker bounding box associated with the blob tracker and an area of a blob bounding box associated with the blob.

19. The apparatus of claim 10, further comprising a camera configured to capture the video data.

20. The apparatus of claim 10, further comprising a network interface configured to communicate the video data.

21. The apparatus of claim 20, wherein the network interface is configured to communicate Internet Protocol (IP) based data.

22. A computer readable medium having stored thereon instructions that, when executed by one or more processors, cause the one or more processor to:
detect a blob in a video frame, wherein the blob includes pixels of at least a portion of a foreground object in the video frame;
determine a spatial relationship between a blob tracker and the blob, the spatial relationship including an overlap between the blob tracker and the blob in at least one or more of a first dimension or a second dimension;
determine a physical distance between the blob tracker and the blob based on the spatial relationship, wherein calculation of the physical distance depends on whether the blob tracker and the blob overlap in the first dimension, in the second dimension, or in both the first dimension and the second dimension; and
determine a cost between the blob tracker and the blob using the physical distance, wherein costs between blob trackers and blobs are used to associate one or more of the blob trackers with one or more of the blobs.

23. The computer readable medium of claim 22, further comprising instructions that, when executed by the one or more processors, cause the one or more processors to associate the blob tracker with the blob based on the determined cost.

24. The computer readable medium of claim 22, wherein the spatial relationship includes an overlap between the blob tracker and the blob in the first dimension and the second dimension.

25. The computer readable medium of claim 24, wherein determining the physical distance between the blob tracker and the blob includes:
   determining a negative distance between the blob tracker and the blob based on the spatial relationship including the overlap between the blob tracker and the blob in the first dimension and the second dimension.

26. The computer readable medium of claim 22, wherein determining the physical distance between the blob tracker and the blob includes:
   determining a minimum distance in the first dimension between the blob tracker and the blob, wherein the minimum distance in the first dimension is determined when the spatial relationship includes an overlap between the blob tracker and the blob in the second dimension and no overlap between the blob tracker and the blob in the first dimension.

27. The computer readable medium of claim 22, further comprising instructions that, when executed by the one or more processors, cause the one or more processors to:
   determine a size ratio between the blob tracker and the blob; and
   wherein determining the cost for the blob tracker and the blob includes weighting the physical distance by the size ratio.

* * * * *

UNITED STATES PATENT AND TRADEMARK OFFICE
CERTIFICATE OF CORRECTION

PATENT NO.      : 10,026,193 B2
APPLICATION NO. : 15/229456
DATED           : July 17, 2018
INVENTOR(S)     : Jinglun Gao et al.

It is certified that error appears in the above-identified patent and that said Letters Patent is hereby corrected as shown below:

In the Claims

Column 28, Lines 53-59, Claim 2, replace "wherein the spatial relationship includes an overlap between the blob tracker and the blob in at least one or more of a first dimension or a second dimension, and wherein calculation of the physical distance depends on whether the blob tracker and the blob overlap in the first dimension, in the second dimension, or in both the first dimension and the second dimension" with --further comprising associating the blob tracker with the blob based on the determined cost--.

Column 28, Line 60, Claim 3, replace "The method of claim 2" with --The method of claim 1--.

Column 29, Line 7, Claim 6, replace "The method of claim 2" with --The method of claim 1--.

Column 29, Line 18, Claim 7, replace "The method of claim 2" with --The method of claim 1--.

Signed and Sealed this
Twentieth Day of August, 2019

Andrei Iancu
*Director of the United States Patent and Trademark Office*